Patented Feb. 24, 1953

2,629,699

UNITED STATES PATENT OFFICE 2,629,699

MODIFIED STARCH-UREA-FORMALDEHYDE WATER RESISTANT ADHESIVE

Edward E. Moore, Yonkers, N. Y., assignor to Stein, Hall & Company, Inc., New York, N. Y., a corporation of New York No Drawing. Application October 20, 1949, Serial No. 122,579

13 Claims. (Cl. 260—17.3)

This invention relates to a dry powder composition consisting essentially of a low-solubles modified starch, a water-soluble heat-hardenable amido-formaldehyde condensate or resin intermediate, an acidic material which has a pH in the range of 5.0 to 5.5 when in 3% aqueous solution, and a higher organic-sulfo-salt detergent, all in critical proportions which are characterized as such as to give a 30% solids cooked aqueous dispersion having an operable viscosity for use as an adhesive in a paper bag forming machine, which adhesive develops into a water resistant bond at ambient temperatures, after application. The invention also relates to a method of cooking an aqueous slurry of this composition to develop an adhesive having an operable viscosity immediately after cooking, which viscosity is stable for a long period of time, up to about one or two weeks or more. The invention also relates to the resulting adhesives.

Adhesive pastes prepared in accordance with the invention are suitable for laminating paper or paper board, paper tube winding, and the like, and they are eminently suitable for use in conventional bag forming machines for making paper bags.

The adhesive art has long sought an economical water resistant adhesive material; and a relatively recent proposal for providing such a material involves cooking a slurry of a commercial dry converted starch in water, and then adding a powdered, soluble urea-formaldehyde condensate. There is added to this paste just prior to its use an acidic catalyst, such as formic acid, to reduce the pH and so that the adhesive will have better water resistance when dried. The art has found that the production and use of such an adhesive involves many difficulties.

Another recent proposal involves cooking an aqueous slurry of starch, urea-formaldehyde condensate and acidic material to lower the pH to substantially 4.0 until the viscosity thereof becomes so high that the material is unsuitable for application; i. e. becomes a gel or very heavy paste. The cooking is then further continued until the viscosity of the paste decreases into the range where it is again suitable for application. This proposal also leaves much to be desired, especially as to avoiding the difficulties associated with the unavoidable thick paste or gel.

It has been found, in accordance with the invention, that an economical water resistant adhesive may be prepared by adding a pre-compounded dry mixture to water in an amount to give a final product having a suitable fluidity for application, and heating the slurry or mixture to about 190° F. The resulting product is of suitable fluidity immediately upon cooking, or after cooling to room temperature, and retains this fluidity for a long period of time, e. g., up to two weeks or more, without becoming so viscous that it is unsuitable for application.

In order to achieve these results, a particular type of modified starch material must be used; and the proportions of the various compounds must be within certain critical ranges.

The objects achieved in accordance with the invention herein disclosed include a provision of a stable dry composition which is adapted for adding to water and cooking to form an adhesive paste having suitable fluidity for application, which paste retains this fluidity for a long period of time, and which paste develops water resistance after drying at ambient room temperature; the provision of a method of cooking this particular composition to provide an adhesive which is suitable for application immediately upon cooking or upon standing for a long period of time, and which develops water resistance after drying; the provision of an economical cooked adhesive paste which is of suitable fluidity for application, which retains this fluidity for a long period of time and which develops water resistance upon drying; and other objects which will be apparent as details or embodiments of the invention are set forth hereinafter.

The particular modified starch required for the purposes of the invention has a content of water solubles in the range of 0 to 30% by weight; and a mixture of 10 to 30 grams thereof with 100 cc. of water brought up to 85° C. (185° F.) is of such a viscosity that 50 cc. thereof at 85° C. will flow through an orifice in a standard pipette in a period of time in the range of 35 to 40 seconds. The orifice in this standard pipette delivers 50 cc. of water at 25° C. in 11 seconds.

A preferred method of preparing such a modified starch is by the dry modification of corn starch having added thereto from about 0.03 to about 0.04% HCl in the form of an about 16% aqueous solution. This mixture is roasted at a relatively low temperature in the range of 250°–400° F. until the solubles content thereof, in distilled water at 25° C., is in the desired range, e. g. 3 to 6% by weight; and until its gram viscosity is in the desired range, e. g., 21–22 grams. This type of modified starch is referred to as a white corn dextrine.

Another method of preparing a suitable modified starch is by the wet modification of corn starch suspended in dilute sulfuric acid (0.1 to 0.2 N) by heating it at about 50° to 55° C. until the paste viscosity is in the desired range; then it is neutralized, filtered, washed and dried. This is called an acid thin boiling corn starch.

The acid modified starch may be used directly, or neutralized, e. g., by gaseous ammonia or a spray of aqueous soda ash and then may be brought to a prescribed standard, e. g., so that a 10% slurry thereof is substantially neutral, or has a pH in the range of 4.8 to 5.0.

The preferred starch materials are made from corn starch. However, other equivalent modified starch materials may be used, provided that the solubles content thereof is in the range of 0 to 30%, and the standard gram viscosity thereof is in the range of 10 to 30 grams. The particular modified starch material used may be made by blending various starch materials, e. g., by blending a modified starch having higher solubles and gram viscosity values, with another having lower values, to give a blend having solubles and viscosity characteristics falling within the prescribed range.

Many modified starches are unsuitable or inoperative for the present purposes, e. g., any canary dextrine having a high solubles content, e. g., in the range of 40 to 99+%, white tapioca dextrine having a high standard gram viscosity, e. g., in the range of 50 to 99 grams, or acid modified thin boiling starches having a very low standard gram viscosity, e. g., in the range of 1 to 8 grams. Unmodified starch is unsuitable, and does not give a 28.6% solids cooked aqueous dispersion having an operable viscosity such as one in the range of 700 to 3600 cps.

The following example relates to a preferred dry formulation, method of preparing a water resistant adhesive therefrom, and the resulting adhesive paste. The dry formulation is prepared and then mixed with water in the proportion of 1 part of the dry formulation to 2.5 parts of water (i. e. about 28.6% by weight solids), and brought up to a temperature of 190° F. The resulting paste may be held at this temperature, e. g. for 15 minutes, but this is not necessary, and it may be cooled or allowed to cool to room temperature. The pH thereof is substantially within the range of 5.0 to 5.5 during the cooking, cooling, and remains within this range upon standing at ordinary temperatures for an extended period, e. g. one or two weeks or more. The viscosity thereof does not exceed the range of 700 to 3600 cps. during the cooking, and its viscosity remains within this range upon cooling to 24° C. and standing at room temperature for an extended period, e. g. one or two weeks or more.

The resulting adhesive paste meets the rather stringent fluidity requirements for use in a paper bag forming machine, and it does not gel or become too viscous for application at any time during an extended period, e. g. up to one or two weeks or more. This adhesive paste is readily prepared in one step, without complications such as gels or unusable pastes, and develops a water resistant bond or seam in a conveniently short period of time upon drying. Its use in conventional bag forming machines, e. g. for making seams of paper bags, does not require changes in the conventional paper bag manufacturing procedure. These features are particularly advantageous from the economical viewpoint.

Water resistance test

Strips of 40# kraft paper are coated with this adhesive, by dipping a ¼ inch diameter glass rod into a batch of the adhesive, drawing out the rod vertically and allowing the excess of the adhesive to flow off, and then horizontally drawing and rolling the rod on one side, e. g. the felt side, of the strip of paper. Another strip of paper is then applied with its other side, e. g. wire side, to this coating or seam of the adhesive, and wiping pressure applied by hand to assure contact. The laminated strips are then dried over-night under pressure (about 1 oz. per sq. in.), and allowed to air-dry at room temperature for 24 hours without pressure.

The aged seam is then tested for water resistance, by totally immersing the seam in a beaker of tap water for 24 hours at room temperature, and then pulling apart the two laminated strips. Good water resistance is indicated by tearing of the fiber in the paper at the seam.

In the following dry formulations, all parts and percentages are by weight, calculated as on an anhydrous basis, unless otherwise indicated. The above described cooking procedure, etc. was followed in the following examples, unless otherwise indicated.

Example 1

Formulation:

| | Parts |
|---|---|
| White corn dextrine— normal 4-8% moisture content, solubles content, 3-6%, pipette viscosity, 21-22 grams | 78 |
| Boric acid ($H_3BO_3$) | 10 |
| Dimethylol urea | 10 |
| Sulfated fatty acid mono glyceride detergent— technical neutral sodium salt about 33% sulfate half ester salt about 67% inorganics, e. g. sodium sulfate | 2 |

| Paste Characteristics | Initial (during cooking and on cooling to 24° C.) | 3 days | 14 days | 28 days | 35 days |
|---|---|---|---|---|---|
| pH | 5.19 | 5.17 | about 5.0 | 5.21 | 5.14 |
| Brookfield viscosity | 700 | 800 | 1,850 | 2,250 | 2,150 |

Dried Paper Seam Characteristics:
- Age of adhesive when seam made _____ 11 days.
- Age of seam when tested _____ 6 days.
- Water resistance _____ satisfactory.

In this example, a 1 quart batch of the adhesive paste was cooled immediately after being brought to 190° F. by means of indirect cooling with tap water, and it was brought to 24° C. within ½ hour.

Example 2

Formulation:

| | Parts |
|---|---|
| White corn dextrine— normal 4-8% moisture content, solubles content, 3-6%, pipette viscosity, 21-22 grams | 78 |
| Boric acid ($H_3BO_3$) | 10 |
| Dimethylol urea | 10 |
| Sulfated fatty acid mono glyceride detergent— technical neutral sodium salt about 33% sulfate half ester salt about 67% inorganics, e. g. sodium sulfate | 2 |

| Paste Characteristics | After overnight cooling to 24° C. | 3 days | 14 days | 28 days | 35 days |
|---|---|---|---|---|---|
| pH | 5.0 | 5.20 | 5.00 | 5.24 | 5.21 |
| Brookfield viscosity | 900 | 1,400 | 2,500 | 2,800 | 3,000 |

Dried Paper Seam Characteristics:
- Age of adhesive when seam made _____ 11 days.
- Age of seam when tested _____ 6 days.
- Water resistance _____ satisfactory.

A 1 quart batch of the cooked paste was allowed to cool by standing in a room at ambient temperature overnight. This procedure gives a paste of slightly higher viscosity than the Example 1 procedure; however, both pastes are well within the desired viscosity range.

Example 3

In the example, the dry formulation is mixed and cooked with water in the proportion of 1 part of the dry formulation to 5 parts of water.

Formulation:

| | Parts |
|---|---|
| Acid thin boiling corn starch— normal 4-8% moisture content, solubles content, 0.5%, pipette viscosity, 12 grams | 78 |
| Boric acid ($H_3BO_3$) | 10 |
| Dimethylol urea | 10 |
| Sulfated fatty acid mono glyceride detergent— technical neutral sodium salt, about 33% sulfate half ester salt, about 67% inorganics, e. g. sodium sulfate | 2 |

| Paste Characteristics | Initial (during cooking and on cooling to 24° C.) | 3 days | 14 days | 28 days | 35 days |
|---|---|---|---|---|---|
| pH | 5.26 | 5.22 | 5.10 | 5.30 | 5.22 |
| Brookfield viscosity | 800 | 1,300 | 1,950 | 2,550 | 2,800 |

Dried Paper Seam Characteristics:
Age of adhesive when seam made_____ 11 days.
Age of seam when tested_____ 6 days.
Water resistance_____ good.

In this example, a 1 quart batch of the adhesive paste was cooled immediately after being brought to 190° F. by means of indirect cooling with tap water, and it was brought to 24° C. within ½ hour.

Example 4

In this example, the dry formulation is mixed and cooked with water in the proportion of 1 part of the dry formulation to 5 parts of water.

Formulation:

| | Parts |
|---|---|
| Acid thin boiling corn starch— normal 4-8% moisture content, solubles content, 0.5%, pipette viscosity, 12 grams | 78 |
| Boric acid ($H_3BO_3$) | 10 |
| Dimethylol urea | 10 |
| Sulfated fatty acid mono glyceride detergent— technical neutral sodium salt, about 33% sulfate half ester salt, about 67% inorganics, e. g. sodium sulfate | 2 |

| Paste Characteristics | After overnight cooling to 24° C. | 3 days | 14 days | 28 days | 35 days |
|---|---|---|---|---|---|
| pH | 5.22 | 5.22 | 5.01 | 5.32 | 5.06 |
| Brookfield viscosity | 1,000 | 1,650 | 2,500 | 2,000 | 2,500 |

Dried Paper Seam Characteristics:
Age of adhesive when seam made_____ 11 days.
Age of seam when tested_____ 6 days.
Water resistance_____ good.

A 1 quart batch of the cooked paste was allowed to cool by standing in a room at ambient temperature overnight. This procedure gives a paste of slightly higher viscosity than the Example 3 procedure; however, both pastes are well within the desired viscosity range.

Example 5

In this example, the modified starch is a blend of 35 parts by weight of acid kiln dried starch (acid is added to the wet starch by the starch manufacturer, and modification takes place during the normal starch drying) and 65 parts by weight of a starch product made by the hereinabove described modification process.

Formulation:

| | Parts |
|---|---|
| Modified corn starch— normal 4-8% moisture content, solubles content, 7-8%, pipette viscosity, 21-22 grams | 78 |
| Boric acid ($H_3BO_3$) | 10 |
| Dimethylol urea | 10 |
| Sulfated fatty acid mono glyceride detergent— technical neutral sodium salt, about 33% sulfate half ester salt, about 67% inorganics, e. g. sodium sulfate | 2 |

| Paste Characteristics | Initial (during cooking and on cooling to 24° C.) | 1 day | 7 days |
|---|---|---|---|
| pH | 5.34 | 5.36 | 5.30 |
| Brookfield viscosity | 1,200 | 1,400 | 3,300 |

Dried Paper Seam Characteristics:
Age of adhesive when seam made_____ 1 day.
Age of seam when tested_____ 3 days.
Water resistance_____ good.

Example 6

In this example, the dry formulation is mixed and cooked with water in the proportion of 1 part of the dry formulation to 2⅓ parts of water.

Formulation:

| | Parts |
|---|---|
| Acid thin boiling corn starch— normal 4-8% moisture content, solubles content, 26.5%, pipette viscosity, 27 grams | 78 |
| Boric acid ($H_3BO_3$) | 10 |
| Dimethylol urea | 10 |
| Sulfated fatty acid mono glyceride detergent— technical neutral sodium salt, about 33% sulfate half ester salt, about 67% inorganics, e. g. sodium sulfate | 2 |

| Paste Characteristics | Initial (during cooking and on cooling to 24° C.) | 1 day | 7 days | 14 days | 21 days |
|---|---|---|---|---|---|
| pH | In the range of 5.0-5.5 | | | | |
| Brookfield viscosity | In the range of 700 to 3600 | | | | |

Dried Paper Seam Characteristics:
Age of adhesive when seam made_____ 15 days.
Age of seam when tested_____ 2 days.
Water resistance_____ good.

In this example, a 1 quart batch of the adhesive paste is cooled immediately after being brought to 190° F. by means of indirect cooling with tap water, and brought to 24° C. within ½ hour.

Example 7

Formulation:

| | Parts |
|---|---|
| White corn dextrine— normal 4-8% moisture content, solubles content, 3-6%, pipette viscosity, 21-22 grams | 78 |
| Boric acid ($H_3BO_3$) | 10 |
| Dimethylol urea | 10 |
| Sodium keryl benzene sulfonate— technical neutral sodium salt, about 40% sulfonate, about 60% inorganics, e. g. sodium sulfate | 2 |

| Paste Characteristics | Initial (during cooking and on cooling to 24° C.) | 1 day | 7 days |
|---|---|---|---|
| pH | 5.0 | 5.0 | 5.0 |
| Brookfield viscosity | 1,160 | 3,320 | 4,100 |

Dried Paper Seam Characteristics:
Age of adhesive when seam made_____ 2 days.
Age of seam when tested_____ 3 days.
Water resistance_____ good.

Example 8

Formulation:

| | Parts |
|---|---|
| White corn dextrine—normal 4-8% moisture content, solubles content, 5-10% pipette viscosity, 25 grams | 78 |
| Boric acid ($H_3BO_3$) | 10 |
| Dimethylol urea | 10 |
| Sulfated fatty acid mono glyceride detergent—technical neutral sodium salt about 33% sulfate half ester salt about 67% inorganics, e. g. sodium sulfate | 2 |

| Paste Characteristics | Initial (during cooking and on cooling to 24° C.) | 1 day | 7 days |
|---|---|---|---|
| pH | 5.05 | 5.02 | 5.00 |
| Brookfield viscosity | 860 | 2,040 | 3,600 |

Dried Paper Seam Characteristics:
Age of adhesive when seam made _____ 7 days.
Age of seam when tested _____ 1 day.
Water resistance _____ good.

In this example, the batch of the adhesive paste was cooled immediately after being brought to 190° F., by means of indirect cooling with tap water, and it was brought to 24° C. within ½ hour.

The dry formulation of the invention is stable and eminently suitable for commercial storage, shipping and handling. The adhesive paste is readily prepared therefrom in one step without complications such as gels or unsuitable pastes, is sufficiently stable for all practical operations and in particular fulfills the rather strict requirements of suitability in machines for making seams in paper bags; and it develops a water resistant bond or seam in a conveniently short period of time upon drying and standing at room temperature.

It is indeed surprising that the adhesive of the invention would form a water resistant bond, in view of the inclusion therein of the organic-sulfo-salt detergent; since it seems most reasonable to expect that the detergent would interfere with or prevent the adhesive prepared therefrom from having or developing water resistance upon drying.

The amount of the organic-sulfo-salt detergent used should provide from about 0.5 to 5 parts in the formulation, preferably 2 to 3 parts, e. g. in a formulation such as that of Example 1, and this detergent contains 30 to 40% of the organic-sulfo-salt and 70 to 60% of water soluble inorganic salt such as sodium sulfate and the like.

The preferred organic-sulfo-salt is a salt of a mono sulfuric acid half ester of a mono glyceride of a fatty acid or mixture of fatty acids having 8 to 18 carbon atoms in the fatty acid radical. The anion thereof may be sodium, potassium, or the like metal, or it may be the anion of a nitrogen base, such as ammonia or the like. Another desirable organic-sulfo-salt is a mono-sulfonate of a mono-alkyl benzene, wherein the alkyl is either straight chain or branch chained and contains from 8 to 18 carbon atoms.

Dimethylol urea is readily available and for this reason is preferred as the amido-formaldehyde condensate. However, other equivalent water-soluble condensates of formaldehyde with urea, or with another amido material (e. g. containing the

group) may be used in an amount to provide the same amount or proportion of methylolamido groups and equivalent to the dimethylol urea.

The proportion of the dimethylol urea or equivalent condensate to be used in the formulation, e. g., a formulation of the type of Example 1, should be in the range of 5 to 10 parts, preferably about 8 parts. If the amount thereof is too low, e. g. 1 part, or 2.5 parts therein, the adhesive does not develop the desired water resistance. If the amount thereof is too high, e. g. 15 or 20 parts therein, the viscosity is too high and there is a tendency for the adhesive to be unstable.

Boric acid is an economic material for providing the required pH in the adhesive, and for this reason it is preferred; either the pure material or a technical grade material gives operable results. The substantially anhydrous form is preferred for the dry formulations. However, the hydrated form or solution is suitable, especially where the mixture is made up directly as the aqueous slurry. Other equivalent acidic compounds or mixtures of compounds, which are characterized as giving a pH in the range of 5.0 to 5.5 at a concentration of 3% in water are suitable. Typical other acidic materials are: a mixture of monosodium and of disodium-orthophosphates which give the desired pH, e. g. 21 to 1 parts by weight, "sodium diacetate," and other buffer systems.

The acidity of the starch material as well as of the condensate and the sulfo-salt ingredient is taken into account in making up the dry formulation, and also in cooking the suspension; it is essential that during and after cooking the pH be substantially in the range of 5.0 to 5.5, and the amount of the acidic material is selected accordingly. In a dry formulation, e. g. a formulation of the type of Example 1, the amount of the boric acid should be in the range of 5 to 10 parts, preferably about 8 parts. If the amount of the boric acid is too low, and the pH is too high in the paste, the resulting adhesive does not develop the desired water resistant bond; e. g. with one part or 2.5 parts of boric acid. If the amount of boric acid therein is too high, and the pH of the paste too low, the viscosity of the paste will be too high or will increase unduly rapidly; e. g. 15 to 20 parts of boric acid therein.

The single, pre-compounded dry formulation of the type of Example 1 is preferred for commercial purposes. However, if desired, the dry formulation may be made up without boric acid, and the acid added after heating the slurry to about 190° F., or even after the heating and then cooling to 24° C.

The compositions of the invention are suitable for making pastes of other solids concentrations; e. g. higher concentrations up to about 35% solids, or down to 15%, if desired, depending upon the application for which the paste is to be used. These pastes are suitable for application at ambient temperatures (e. g. 70° F.) or elevated temperatures up to about 190° F.; and they may be used for laminating paper or paper board, paper tube winding, or the like. The desired particular viscosity and other physical properties of the paste may be attained by adjusting the concentrations and proportions of the solids, and in some cases a somewhat higher viscosity starch component may be used.

As already pointed out, the formulation of the invention is one consisting essentially of the above described components; but there may be included therewith other materials such as preservatives, fillers, extenders, or the like, as known to those skilled in the art, and which do not interfere with the purposes of the invention as set forth in the foregoing descriptions.

The invention as herein described is subject to modification and variation within the scope of the appended claims.

I claim:

1. A dry powder composition consisting essentially of 78 parts of a modified starch which has a water-solubles content in the range of about 0 to 30%, 5 to 10 parts of a water-soluble heat-hardenable urea-formaldehyde condensate, 5 to 15 parts of an acidic material which gives a 3% aqueous solution having a pH in the range of 5.0 to 5.5, and 0.5 to 5 parts of a mixture of 30 to 40% of a water-soluble salt of an organic sulfuric reaction product containing an alkyl radical of from 8 to 18 carbon atoms and a radical selected from the group consisting of a sulfate ester radical and a sulfonic radical and 70 to 60% of a neutral water-soluble inorganic salt, said composition being characterized by giving a stable adhesive paste upon cooking a 28.6% solids aqueous dispersion thereof which paste has a pH in the range of 5.0 to 5.5 and is of suitable fluidity for application and which develops into a water resistant bond upon drying and standing at room temperature.

2. The composition of claim 1 wherein the starch component is a modified corn starch which gives a 10 to 30 gram dispersion in 100 cc. of water having a 50 cc. standard pipette viscosity in the range of 35 to 40 seconds when heated to 85° C., and the paste has a Brookfield viscosity at 25° C. in the range of 700 to 3600 cps.

3. The composition of claim 2 wherein the urea-formaldehyde condensate is dimethylol urea.

4. A dry powder composition consisting essentially of 78 parts by weight of a partially neutralized white corn dextrine modified starch which has a water-solubles content in the range of 3 to 6% by weight and gives a 21-22 gram dispersion in 100 cc. of water having a standard pipette viscosity of 35 to 40 seconds when heated to 85° C., 5 to 10 parts of dimethylol urea, 5 to 15 parts of boric acid, and 2 parts of a mixture of 33% of neutral sodium sulfated fatty mono glyceride wherein the fatty group contains from 8 to 18 carbon atoms, and 67% of inorganic salt, said composition being characterized by giving a stable adhesive paste upon cooking a 28.6% solids aqueous dispersion thereof which paste has a pH in the range of 5.0 to 5.5 and a Brookfield viscosity at 25° C. in the range of 700 to 3600 cps. and which develops into a water resistant bond upon drying and standing at room temperature.

5. A process of preparing an adhesive which comprises forming a 15 to 35% solids aqueous dispersion of a composition consisting essentially of 78 parts of a modified starch which has a water-solubles content in the range of about 0 to 30%, 5 to 10 parts of a water-soluble heat-hardenable urea-formaldehyde condensate, an acidic material in an amount to give the dispersion a pH in the range of 5.0 to 5.5, and 0.5 to 5 parts of a mixture of 30 to 40% of a water-soluble salt of an organic sulfuric reaction product containing an alkyl radical of from 8 to 18 carbon atoms and a radical selected from the group consisting of a sulfate ester radical and a sulfonic radical and 70 to 60% of a neutral water-soluble inorganic salt, and heating said dispersion to 190° F., the pH of said dispersion being in the range of 5.0 to 5.5 during and after said cooking, whereby there is formed a stable adhesive paste which is operable for use as an adhesive and which develops into a water resistant bond upon drying and standing at room temperature.

6. An adhesive paste prepared by the process of claim 5.

7. The process of claim 5 wherein the starch component is modified corn starch which gives a 10 to 30 gram dispersion in 100 cc. of water having a 50 cc. standard pipette viscosity in the range of 35 to 40 seconds when heated to 85° C.

8. An adhesive paste prepared by the process of claim 7.

9. The process of claim 7 wherein the urea-formaldehyde condensate is dimethylol urea.

10. An adhesive paste prepared by the process of claim 9.

11. The process of claim 9 wherein the acidic material is added after the dispersion is heated to 190° F.

12. A process of preparing an adhesive which comprises forming a 28.6% aqueous dispersion of a composition consisting essentially of 78 parts of a white corn dextrine modified starch which has a water-solubles content in the range of 3 to 6% and gives a 21-22 gram dispersion in 100 cc. of water having a 50 cc. standard pipette viscosity in the range of 35 to 40 seconds when heated to 85° C., 5 to 10 parts of dimethylol urea, boric acid in an amount to give the dispersion a pH in the range of 5.0 to 5.5, and 2 parts of a mixture of 33% of neutral sodium sulfated fatty mono glyceride wherein the fatty group contains from 8 to 18 carbon atoms, and 67% of inorganic salt, and heating said dispersion to 190° F., the pH of said dispersion being in the range of 5.0 to 5.5 during and after said cooking, whereby there is formed a stable adhesive paste which is operable for use as an adhesive and which develops into a water resistant bond upon drying and standing at room temperature.

13. An adhesive paste prepared by the process of claim 12.

EDWARD E. MOORE.

REFERENCES CITED

The following references are of record in the file of this patent:

UNITED STATES PATENTS

| Number | Name | Date |
| --- | --- | --- |
| 2,302,309 | Glarum | Nov. 17, 1942 |
| 2,400,820 | Glarum | May 21, 1946 |
| 2,463,148 | Caesar | Mar. 1, 1949 |
| 2,544,714 | Moore | Mar. 13, 1951 |